Figure 1:
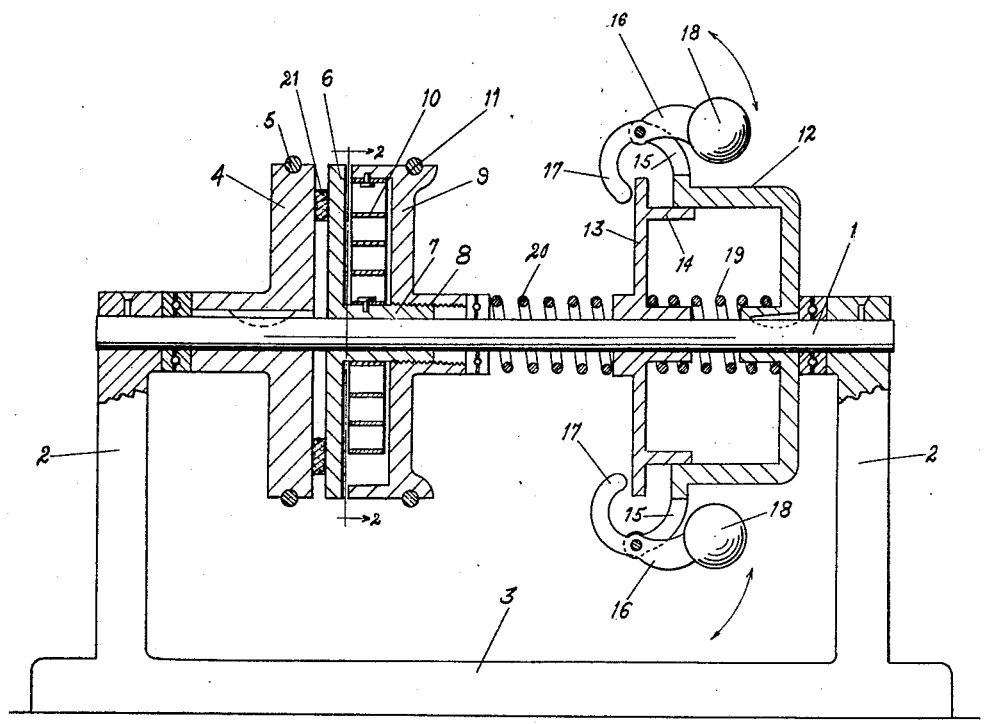

Sept. 15, 1931.    J. M. MILLER    1,823,280

COMPENSATING GOVERNOR

Filed Nov. 6, 1929

INVENTOR.
JOHN M. MILLER,
BY
ATTORNEY.

Patented Sept. 15, 1931

1,823,280

UNITED STATES PATENT OFFICE

JOHN M. MILLER, OF NEW YORK, N. Y., ASSIGNOR TO OWENS DEVELOPMENT CORPORATION, OF NEW YORK, N. Y.

COMPENSATING GOVERNOR

Application filed November 6, 1929. Serial No. 405,261.

This invention relates to improvements in compensating speed control governors, the principal object of the invention being to provide a governor of the fly ball type which will automatically compensate for varying loads on the driven mechanism and thereby maintain the same at uniform speed.

A further object of the invention is the provision, in combination with a fly ball governor, of means controlled by the load on the driven mechanism for varying the speed at which the governor comes into action.

Other objects and advantages of the invention will appear as the description proceeds.

Figure 2:
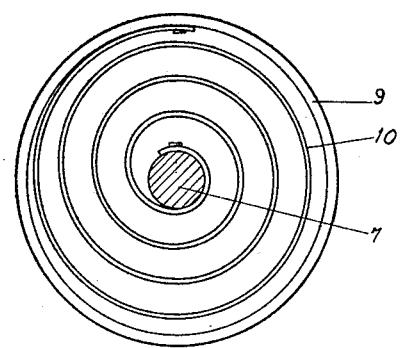

In the drawings accompanying this specification,

Figure 1 is a longitudinal sectional view of a speed control governor embodying the features of the present invention; and Figure 2 is a transverse sectional view taken approximately on the line 2—2 of Figure 1.

Referring to the drawings, 1 designates a shaft mounted for rotation in bearings carried by standards 2 extending upward from a base plate 3. Keyed to the shaft adjacent to one end thereof is a pulley 4 adapted to receive motion by means of a belt 5 from any suitable source of power. Mounted on the shaft for rotation relatively thereto and for axial movement toward and from the pulley 4 is a disk 6 having an elongated hub 7 on which is threaded the hub 8 of a flanged pulley 9, said pulley and disk forming between them a chamber in which is disposed a coil spring 10 secured at one end to the hub 7 of the disk and at its opposite end to the flange of the pulley. The pulley 9 carries a belt 11 for transmitting motion to any desired mechanism.

Keyed on the shaft 1 at the end thereof opposite from the pulley 4 is an open ended drum or housing 12, and mounted for rotation and for axial movement on the shaft 1 in position to close the open end of said drum is a disk 13 provided with an axially extending flange 14 fitting within the drum. The drum is provided at its open end with curved and bifurcated brackets 15, in each of which is centrally pivoted an arm 16 having at one end a curved finger 17 and at its opposite end a weight 18, said curved fingers overlapping the edge of the disk 13. Within the drum 12, a coil spring 19 is disposed around the shaft 1, said spring abutting at its opposite ends respectively against the disk 13 and the end wall of the drum whereby the tension of the spring will tend to urge the disk away from the drum. A similar coil spring 20 is disposed around the shaft between the hub of the pulley 9 and the disk 13 at the side thereof opposite from the spring 19, the tension of said springs 19 and 20 thus opposing each other.

In the construction above described, the disk 6 is adapted to frictionally engage the pulley 4, these two members thus forming a clutch for transmitting motion from the driving belt 5 to the driven belt 11, and for that purpose a ring 21 of friction material is interposed between the opposing faces of the disk and pulley, said ring being secured to the face of either of said members.

In the normal operation of the device the tension of the springs 19 and 20 will maintain the clutch faces of the pulley 4 and disk 6 in frictional engagement, and the curved fingers 17 will remain in the position shown in Figure 1 of the drawings. However, should the rotation of the shaft exceed a certain predetermined speed, the weights 18 will move outward in the direction indicated by the arrows, thereby swinging the arms 16 on their pivots and causing the ends of the fingers 17 to engage the disk 13 and exert pressure thereof in opposition to the tension of the spring 19, thus relieving the tension of the spring 20 and consequently weakening the frictional engagement of the disk 6 with the pulley 9 so that a certain amount of slippage will occur until the speed of rotation of the pulley is reduced to normal, whereupon the weights 18 and fingers 17 will return to their inoperative position. On the other hand, the spring 10 will serve to compensate for any lack of uniformity in the load imposed on the pulley 9, for the reason that any change in the load on said pulley will cause the same to rotate slightly one way or the other on the threaded hub 7 of the disk 6, which will of course cause the pulley to back away from or draw closer to the disk 6, thus increasing or decreasing the tension of the spring 20 against the hub of the pulley and thereby changing the position of the disk 13 with relation to the fingers 17 of the governor so that said fingers must move a greater or less distance before engaging the disk. If the direction of rotation of the pulley 9 relative to the disk 6 is such as to wind the spring 21 owing to an increase of the load, as soon as the load is again reduced to normal the tension of the spring 21 will cause the pulley 9 to rotate in the opposite direction on the hub 7 of the disk and thus return to its normal position.

It will of course be understood that while the drawings show only two fly ball devices, any desired number may be used to provide a properly balanced mechanism. I am aware that mechanical modifications may be made in this as well as in many other respects without departing from the spirit and scope of the appended claims.

I claim:

1. A speed control governor, comprising in combination, a driving member mounted for rotation, a centrifugal governor rotatable with said driving member, a clutch member disposed in juxtaposition to the driving member, a driven member between said clutch member and governor, a tension spring disposed between said governor and driven member and adapted to maintain the clutch member in frictional engagement with the driving member, means controlled by the governor for automatically varying the tension of said spring in accordance with the speed of rotation of the driving member, and cooperating means carried by the clutch member and driven member for varying the tension of said spring in accordance with the load on said driven member.

2. A speed control governor, comprising in combination, a driving member mounted for rotation, a centrifugal governor rotatable with said driving member, a clutch member disposed in juxtaposition to the driving member, a driven member between said clutch member and governor, a pair of springs acting in opposition to each other between said governor and driven member and adapted normally to maintain the clutch member in frictional engagement with the driving member, means between said springs and engageable by said governor for compressing one of said springs and reducing the tension of the other on the driven member in accordance with the speed of rotation of the driving member, and cooperating means carried by the clutch member and driven member for varying the tension of said spring in accordance with the load on said driven member.

3. A speed control governor, comprising in combination, a driving member mounted for rotation, a centrifugal governor rotatable with said driving member, a clutch member disposed in juxtaposition to the driving member, a driven member between said clutch member and governor, a tension spring disposed between said governor and driven member and adapted to maintain the clutch member in frictional engagement with the driving member, means controlled by the governor for automatically varying the tension of said spring in accordance with the speed of rotation of the driving member, the driven member being connected with the clutch member for rotary and axial movement relative thereto thereby to vary the tension of said spring in accordance with the load on said driven member.

4. A speed control governor, comprising in combination a driving member mounted for rotation, a centrifugal governor rotatable with said driving member, a clutch member disposed in juxtaposition to the driving member, a driven member between said clutch member and governor, a pair of springs acting in opposition to each other between said governor and driven member and adapted normally to maintain the clutch member in frictional engagement with the driving member, means between said springs and engageable by said governor for compressing one of said springs and reducing the tension of the other on the driven member in accordance with the speed of rotation of the driving member, the driven member being connected with the clutch member for rotary and axial movement relative to said clutch member thereby to vary the tension of the springs independently of the governor.

5. A speed control governor, comprising in combination, a shaft mounted for rotation, a driving member secured to said shaft, a centrifugal governor secured to said shaft for rotation with said driving member, a clutch member mounted on said shaft for rotation thereon in juxtaposition to the driving member, a driven member mounted for rotation on said shaft between said clutch member and governor, a pair of tension springs encircling the shaft between said governor and driven member and adapted to maintain the clutch member in frictional engagement with the driving member, means between said springs and engageable by said governor for compressing one of said springs and reducing the tension of the other on the driven member in accordance with the speed of rotation of the driving member, the driven member having a threaded connection with the clutch member whereby the driven member will have rotary and axial movement with relation to said clutch member thereby to vary the tension of the springs in accordance with the load on the driven member and independently of the governor.

6. A speed control governor, comprising in combination, a shaft mounted for rotation, a driving member secured to said shaft, a centrifugal governor secured to said shaft for rotation with said driving member, a clutch member mounted on said shaft for rotation thereon in juxtaposition to the driving member, a driven member mounted for rotation on said shaft between said clutch member and governor, a pair of tension springs encircling the shaft between said governor and driven member and adapted to maintain the clutch member in frictional engagement with the driving member, means between said springs and engageable by said governor for compressing one of said springs and reducing the tension of the other on the driven member in accordance with the speed of rotation of the driving member, the driven member having a threaded connection with the clutch member whereby the driven member will have rotary and axial movement with relation to said clutch member thereby to vary the tension of the springs in accordance with the load on the driven member and independently of the governor, and a resilient member between the driven member and clutch member for restoring them to normal position.

7. A speed control governor, comprising in combination, a shaft mounted for rotation, a driving member secured to said shaft for rotation therewith, a drum secured to the shaft for rotation therewith and open towards said driving member, a clutch disk mounted for rotation on said shaft in juxtaposition to the driving member, said clutch disk having an elongated hub extending axially toward said drum, a driven member threaded on said hub, a disk mounted for rotation on the shaft adjacent to the open end of said drum, a coil spring encircling said shaft between said disk and the driven member, a coil spring encircling the shaft between said disk and the end wall of said drum, said springs being adapted normally to maintain the clutch disk in frictional engagement with the driving member and the other disk at a predetermined distance from said drum, a plurality of centrifugally acting members carried by said drum and having means for engaging the last mentioned disk and urging it toward the drum thereby to compress one of said springs and reduce the tension of the other in accordance with variations in the speed of rotation of the driving member, the threaded engagement of the driven member with the clutch disk hub and the associated coil spring constituting means for varying the tension of said springs independently of said centrifugally acting means.

In testimony whereof, I affix my signature.

JOHN M. MILLER.